Patented Oct. 18, 1932

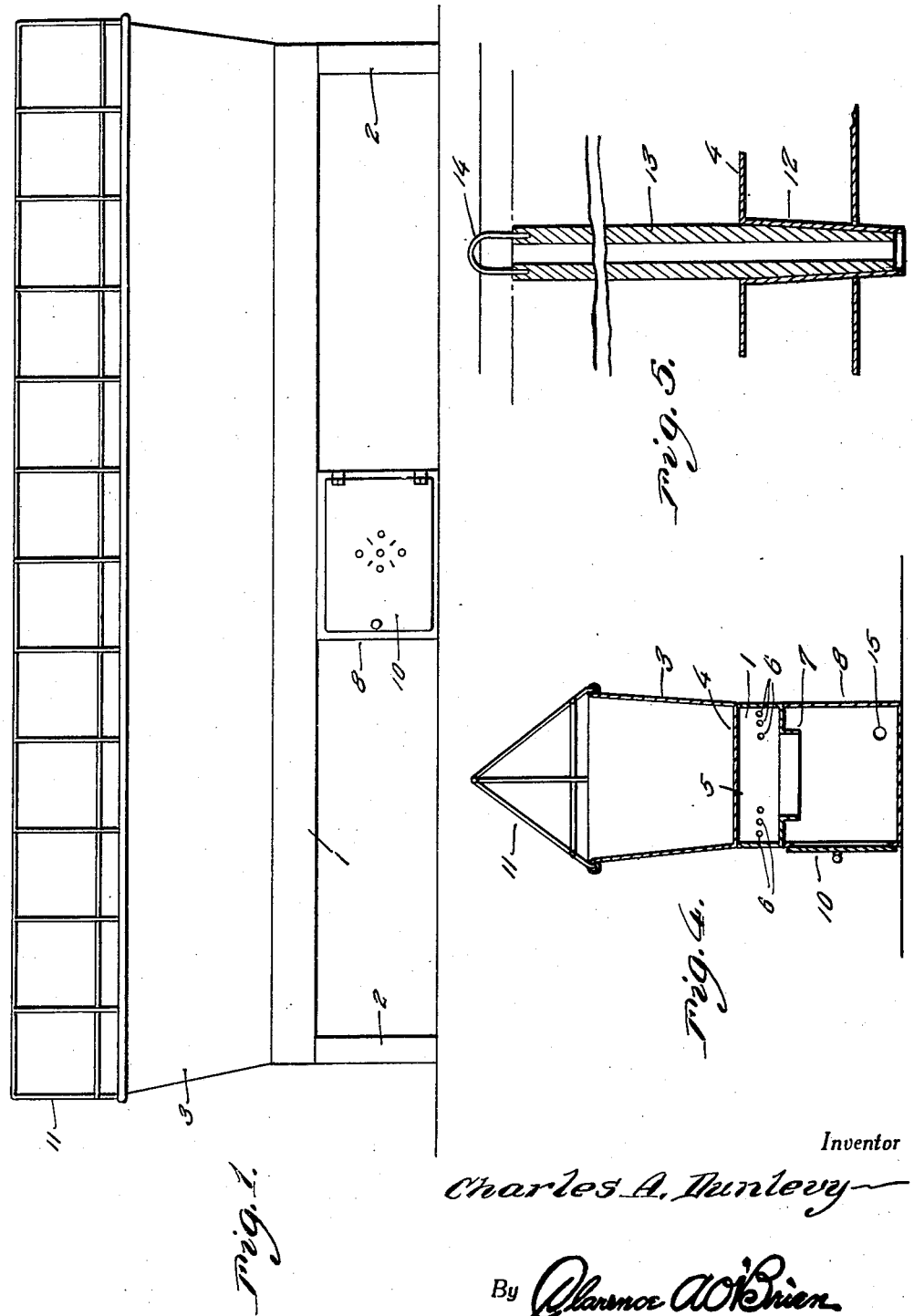

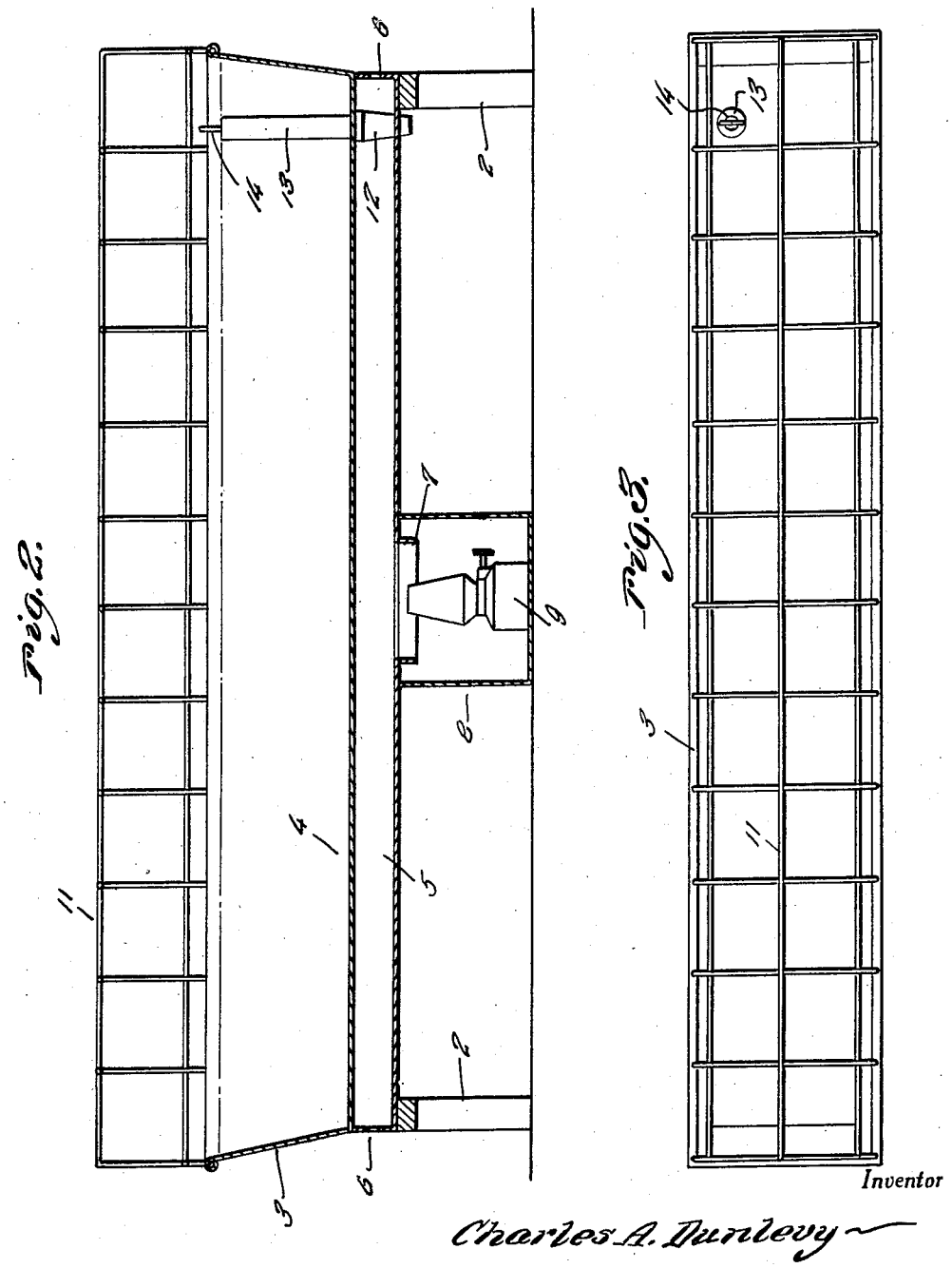

1,883,631

UNITED STATES PATENT OFFICE

CHARLES A. DUNLEVY, OF MONONGAHELA, PENNSYLVANIA

POULTRY WATERER

Application filed January 10, 1931. Serial No. 507,914.

This invention relates to a poultry waterer and has for its primary object to provide, in a manner as hereinafter set forth, a device of this character embodying novel construction and arrangement of parts whereby freezing of the water therein will be prevented at all times.

Other objects of the invention are to provide a poultry waterer of the character described which will be simple in construction, strong, durable, efficient and reliable in use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view in side elevation of a poultry waterer in accordance with this invention.

Figure 2 is a view in vertical longitudinal section of the device.

Figure 3 is a view in top plan thereof.

Figure 4 is a vertical cross sectional view of the poultry waterer.

Figure 5 is a detail view in vertical section showing the overflow means.

Referring to the drawings in detail, it will be seen that the reference numeral 1 designates an elongated horizontally disposed casing which is supported in elevated position by the legs 2. The top of the casing 1 is open and resting thereon is the elongated trough 3 the bottom 4 of which constitutes the top of a hot air chamber 5 provided by the casing 1. The end walls of the casing 1 are provided with openings 6 for the escape of hot air from the casing.

A neck 7 depends from an intermediate portion of the bottom of the casing 1 into a housing 8 which is removably disposed beneath the casing 1. The housing 8 is adapted to receive a heating lamp of any suitable type 9 and is provided with a hinged door 10 in order that access may be had to the interior of the housing when the same is in position beneath the casing 1.

The trough 3 is, of course, adapted to contain the water and this trough has disposed over the top thereof a fabricated metallic guard 11 to prevent the poultry from entering the trough. Adjacent one end of the trough 3 a tapered tube 12 depends from the bottom 4 of said trough and extends through the bottom of the casing 1, as illustrated to advantage in Figure 5 of the drawings. The tube 12, of course, communicates with the interior of the trough 3. An overflow conduit 13 of any suitable material, preferably wood, is provided with a tapered lower end portion and is adapted to be driven tightly into the tube 12, the conduit 13 extending upwardly and terminating below the horizontal plane of the top of the trough 3. Obviously, the water in the trough 3 cannot rise above the upper end of the conduit 13 and thus an overflow pipe is provided. A substantially inverted U-shaped handle 14 is anchored in the upper end of the conduit 13 to facilitate withdrawal of said conduit from the tube 12 when it is desired to drain the trough 3. It will thus be seen that the tube 12 constitutes a drain spout. As best seen in Figure 4 of the drawings, the housing 8 is provided with an air inlet opening 15. Any desired number of these inlet openings 15 may, of course, be provided in the housing 8 and it will be further understood that any desired number of the hot air outlet openings 6 may be provided in the casing 1.

In use, heated air from the housing 8 passes upwardly through the neck 7 into the hot air chamber 5 of the casing 1 and passes toward the opposite ends of said casing and escapes through the openings 6. The depending neck 7 prevents back drafts of the air from the chamber 5. In passing toward the outlet openings 6 through the chamber 5 the hot air, of course, contacts with the bottom 4 of the trough 3 and thus the water in the trough is prevented from freezing. As before stated, the conduit 13 constitutes an overflow pipe and the tube 12 constitutes a drain spout.

It is believed that the many advantages of a poultry waterer in accordance with this invention will readily understood, and although the preferred embodiment of the invention is as illustrated and described, it is to be understood that changes in the details of construction may be had which will fall within the scope of the invention as claimed.

What is claimed is:—

1. A poultry waterer comprising a horizontally disposed casing, said casing being open at its top, a trough, for the reception of the water, mounted on top of the casing, the bottom of the trough constituting a closure for the top of the casing and, in conjunction with said casing, providing a hot air chamber beneath the trough, means for supplying heated air to the chamber for warming the water in the trough, a tapered tube communicating with the trough and depending from the bottom thereof through the hot air chamber and projecting through the bottom of the casing, and an overflow pipe removably mounted vertically in the tube and extending upwardly therefrom in the trough, the tube constituting a drain spout when the overflow pipe is removed therefrom, said overflow pipe having a tapered lower end portion conforming substantially to the shape of the tube.

2. In a poultry waterer, the combination with a trough for receiving water, of a tube communicating with the trough and depending from the bottom thereof, and an overflow pipe removably mounted vertically in said tube and extending upwardly therefrom in the trough, the tube constituting a drain spout when the overflow pipe is removed therefrom.

In testimony whereof I affix my signature.

CHARLES A. DUNLEVY.